(12) United States Patent
Kemball-Cook et al.

(10) Patent No.: US 8,736,088 B2
(45) Date of Patent: May 27, 2014

(54) ENERGY HARVESTING

(75) Inventors: Laurence Kemball-Cook, Harbledown (GB); Philip Tucker, Harbledown (GB)

(73) Assignee: Pavegen Systems Limited, Canterbury, Kent (GB)

( * ) Notice: Subject to any disclaimer, the term of this patent is extended or adjusted under 35 U.S.C. 154(b) by 47 days.

(21) Appl. No.: 13/642,093

(22) PCT Filed: May 4, 2011

(86) PCT No.: PCT/GB2011/000686
§ 371 (c)(1),
(2), (4) Date: Dec. 5, 2012

(87) PCT Pub. No.: WO2011/138585
PCT Pub. Date: Nov. 10, 2011

(65) Prior Publication Data
US 2013/0068047 A1 Mar. 21, 2013

(30) Foreign Application Priority Data
May 5, 2010 (GB) .................................. 1007497.9

(51) Int. Cl.
*F02B 63/04* (2006.01)
*F03G 7/08* (2006.01)
*H02K 7/18* (2006.01)

(52) U.S. Cl.
USPC ........................................................ 290/1 R

(58) Field of Classification Search
USPC ........................................................ 290/1 R
See application file for complete search history.

(56) References Cited

U.S. PATENT DOCUMENTS

| | | | | |
|---|---|---|---|---|
| 1,916,873 A * | 7/1933 | Wiggins | .......................... | 185/39 |
| 3,964,264 A * | 6/1976 | Tornabene | ...................... | 405/76 |
| 4,239,975 A * | 12/1980 | Chiappetti | ..................... | 290/1 R |
| 4,739,179 A * | 4/1988 | Stites | .............................. | 290/1 R |
| 4,980,572 A * | 12/1990 | Sen | ................................. | 290/1 R |
| 6,204,568 B1* | 3/2001 | Runner | .......................... | 290/1 R |
| 6,353,270 B1* | 3/2002 | Sen | ................................. | 290/1 R |
| 6,767,161 B1* | 7/2004 | Calvo et al. | ..................... | 404/71 |
| 6,858,952 B2* | 2/2005 | Gott et al. | ...................... | 290/1 R |
| 7,067,932 B1* | 6/2006 | Ghassemi | ..................... | 290/1 R |
| 7,102,244 B2* | 9/2006 | Hunter, Jr. | ..................... | 290/1 R |
| 7,304,398 B1* | 12/2007 | Kim et al. | ...................... | 290/1 E |
| 7,432,607 B2* | 10/2008 | Kim et al. | ...................... | 290/1 R |
| 7,476,984 B2* | 1/2009 | Kim et al. | ...................... | 290/1 E |
| 7,541,684 B1* | 6/2009 | Valentino | ...................... | 290/1 R |
| 7,589,427 B2* | 9/2009 | Davis | ............................. | 290/1 R |
| 7,605,482 B2* | 10/2009 | Brown et al. | .................. | 290/1 R |
| 7,626,279 B2* | 12/2009 | Brown et al. | .................. | 290/1 R |
| 7,629,698 B2* | 12/2009 | Horianopoulos et al. | ..... | 290/1 R |
| 7,714,456 B1* | 5/2010 | Daya | ............................. | 290/1 R |
| 8,070,379 B2* | 12/2011 | Zana | ................................ | 404/6 |
| 8,123,431 B2* | 2/2012 | Chen | .............................. | 404/71 |
| 8,164,204 B2* | 4/2012 | Jang | .............................. | 290/1 R |
| 8,217,523 B2* | 7/2012 | Brown et al. | .................. | 290/1 R |
| 8,251,183 B2* | 8/2012 | Chen | ................................ | 185/39 |
| 8,344,527 B2* | 1/2013 | Becerra | ......................... | 290/1 R |

(Continued)

*Primary Examiner* — Pedro J Cuevas
(74) *Attorney, Agent, or Firm* — Mossman Kumar & Tyler PC

(57) ABSTRACT

The present application describes techniques for the harvesting of kinetic energy from the movement of people and/or vehicles. A motion converter is discussed which converts linear progression caused by traffic-related impulse forces, to be converted to rotational motion for driving the rotor of an electricity generator. An assembly for harvesting energy including the motion converter and a floor unit are also described.

19 Claims, 6 Drawing Sheets

(56) References Cited

U.S. PATENT DOCUMENTS

| | | | |
|---|---|---|---|
| 8,497,589 B2 * | 7/2013 | Geletka | 290/1 R |
| 2005/0204935 A1 * | 9/2005 | Siegel | 99/495 |
| 2006/0207441 A1 * | 9/2006 | Mulhauser et al. | 99/495 |
| 2008/0164701 A1 * | 7/2008 | Brown et al. | 290/1 E |
| 2008/0164702 A1 * | 7/2008 | Brown et al. | 290/1 E |
| 2010/0117374 A1 * | 5/2010 | Geletka | 290/1 |
| 2010/0263555 A1 * | 10/2010 | Mah et al. | 99/495 |
| 2011/0221209 A1 * | 9/2011 | Ryan | 290/1 R |
| 2012/0061895 A1 * | 3/2012 | Holcomb et al. | 269/57 |
| 2012/0211996 A1 * | 8/2012 | Jang | 290/1 R |
| 2012/0246959 A1 * | 10/2012 | Perry et al. | 34/58 |

* cited by examiner

ENERGY HARVESTING

The present invention relates to techniques for energy harvesting, in particular to techniques for the harvesting of kinetic energy from the movement of people and/or vehicles.

There is currently considerable focus on the development of new and improved ways to provide sustainable energy sources. Techniques for harvesting energy from pedestrian footfall and/or vehicle traffic have been previously considered, but these have not proved sufficiently effective and have a number of drawbacks.

There is therefore a need to mitigate the drawbacks associated with known kinetic energy harvesting devices and/or to provide a more effective system for harvesting kinetic energy from the movement of people and/or vehicles.

According to a first aspect of the present invention there is provided a motion convertor for converting kinetic energy from the movement of traffic into rotational energy for operating the rotor of an electricity generator, the motion convertor comprising at least one engagement element and a rotatable disk, the engagement element being linearly-displaceable relative to the rotatable disk, wherein the engagement element is configured such that progressive linear displacement in a direction towards the rotatable disk causes engagement of the engagement element with the rotatable disk, thereby causing the rotatable disk to rotate.

Thus, according to preferred embodiments of the present invention, the engagement element is arranged to be linearly-displaceable relative to the plane of rotation of the rotatable disk such that progressive linear displacement in a direction towards the rotatable disk causes progressive engagement of the engagement element with the rotatable disk, thereby causing the rotatable disk to rotate.

According to embodiments of the present invention kinetic energy (typically impulse forces arising from traffic flow) is captured in the form of linear motion of the engagement element(s), and is converted to rotational motion suitable for driving the rotor of an electricity generator. One of the key advantages of the present invention is the generation of substantially uninterrupted rotational motion from the linear displacement of the engagement elements.

There are various ways in which the rotatable disk may be arranged to spin and which enable the harvested kinetic energy to be efficiently stored as rotational energy.

One such arrangement involves the use of a rolling-element bearing at the centre of the disk to facilitate cooperation between the rotatable plate and an axial shaft. This arrangement is advantageous since it allows the rotatable disk to rotate with very little resistance, thereby minimising frictional energy losses between the rotatable disk and the shaft.

An alternative arrangement involves the use of a so-called "point bearing" or the like whereby a bolt or "pin", which may be formed of hard steel or other suitable material, cooperates with the centre of the rotatable disk such that the disk is rotatable about the point bearing. According to this arrangement, which is particularly efficient due to the very low frictional forces experienced by the disk as it spins, the rotatable disk rotates in the manner of a gyroscope or "flywheel".

According to one embodiment, the engagement element(s) comprise a plurality of teeth, the teeth being arranged such that progressive linear motion of the engagement element(s) in a first direction towards the rotatable disk causes the teeth to successively cooperate with the rotatable disk. Preferably, in this case, the rotatable disc is provided with a plurality of indentations in the surface thereof which are arranged such that progressive linear motion of the engagement element(s) causes each of the plurality of teeth to successively cooperate with one of the indentations.

According to a presently preferred embodiment, the engagement element(s) comprises a curved engagement edge, the curved engagement edge being shaped such that progressive linear motion of the engagement element in a first direction towards the rotatable disk causes progressive engagement of the curved engagement edge with the rotatable disk. Preferably, in this case, the rotatable disc is provided with a plurality of radially-extending grooves which are disposed such that progressive linear motion of the engagement element(s) causes progressive engagement of the curved engagement edge of the, or each, engagement element(s) with one of the radially-extending grooves. The curved engagement edge may, for example, be arcuate in shape—i.e. it may follow the curve of a circle. Alternatively, the curved engagement edge may exhibit a curved or variable gradient path which is selected to allow a particular progressive engagement with rotatable disk in use.

Preferably, the radially-extended grooves are shaped, e.g. curved, so as to substantially compliment the progressive engagement of the curved engagement edge of the engagement element(s) in use.

Thus, the radially-extending grooves serve to transfer energy from the engagement element(s) to the rotatable disk. According to preferred embodiments of the present invention, in order to maximise the energy captured from the expected traffic, the geometry or shape of the radially-extending grooves is advantageously optimised with respect to the inertial mass of the disk and the nature (e.g. length and magnitude) of the expected impulse.

In order to make use of the kinetic energy harnessed and converted to rotational energy by the motion converter, it is desirable for the rotational motion of the rotatable disk to be used to drive an electricity generator.

According to a second aspect of the present invention there is provided an apparatus for harvesting kinetic energy comprising a motion converter and an electricity generator, the motion convertor comprising one or more engagement elements and a rotatable disk, the engagement elements being linearly-displaceable in a first direction towards the rotatable plate, wherein progressive linear motion of the engagement elements causes them to cooperate with the rotatable disk so as to cause rotation of the rotatable disk, and wherein rotation of the rotatable disk operates a rotor of the electricity generator.

Thus, according to embodiments of the first and second aspects, the harvested energy can advantageously be used to generate electrical energy. The electrical energy may be advantageously stored for subsequent use and/or connected for powering devices such as illumination devices. For example, the energy generated from an energy harvester embodying the present invention may be used to power street lighting schemes, shop frontages, information displays and the like.

Embodiments of the second aspect of the present invention provide an elegant and effective solution for powering systems, such as illumination systems, without utilising electricity from the main grid supply.

According to embodiments of the second aspect of the present invention, various configurations for the electricity generator are envisaged as will be readily appreciated by the skilled person. According to one such configuration, the electricity generator advantageously comprises a stator having a plurality of conductive windings and planar rotor, the rotor having a plurality of magnets attached thereto. Preferably, the planar rotor is configured to rotate concurrently with the rotatable disk. According to one arrangement, the rotatable disk comprises the planar rotor of the generator.

According to a preferred embodiment, the generator comprises a stator having a plurality of conductive windings and a twin rotor comprising a pair of planar rotors. Preferably, the pair of rotors are configured to spin concurrently with each other and with the rotatable disk. According to an embodiment of the present invention, the stator of the electricity generator comprises a plurality of coils which, in the case of an axial flux generator, are disposed such that the magnets fixed to the rotatable disk move over the series of coils upon rotation of the rotatable disk. A radial flux generator configuration is also envisaged within the scope of the present invention, wherein the windings of the coils are disposed around the plane of rotation of the rotor. A radial flux generator configuration is particularly beneficial in conjunction with an arrangement whereby the rotatable disk is configured to rotate about a point bearing and wherein the rotatable disk comprises a plurality of magnets thereby forming a rotor of the electricity generator.

Piezo-electric generators are also envisaged within the scope of the present invention, wherein rotation of the rotatable disk is arranged to apply mechanical stress to piezoelectric elements, i.e. elements formed form piezoelectric material, to thereby generate an electric voltage.

It is envisaged that an apparatus for harvesting kinetic energy, according to embodiments of the second aspect of the present invention, may be installed so as to form part of a floor surface or covering, which may be internal or external, in order that the kinetic energy of "traffic" (pedestrian or vehicular) passing in the region of the floor may be harnessed.

According to a third aspect of the present invention there is provided a floor unit, such as a paving unit, comprising an apparatus for harvesting kinetic energy according to the second aspect, wherein the floor unit comprises a depressible upper surface and wherein downward deflection of the depressible upper surface causes linear progression of the engagement element(s) in a first direction towards the rotatable disk.

It will be appreciated that references to the "upper surface" of the floor unit should be interpreted in relation to the normal orientation of the floor unit in use. Thus, the depressible upper surface should be taken to mean the surface of the floor unit which faces upwardly when located in, or on, the ground in use, e.g. when the unit is installed so to form a part of a flooring scheme.

A floor unit according to an embodiment of the third aspect of the present invention is suitable for forming part of a floor or floor/ground covering. For example, a floor unit of the present invention may act as a paving unit of a paved floor surface.

Embodiments of the third aspect of the present invention find particular applicability to high traffic areas, especially high "footfall" areas—i.e. areas experiencing high volumes of pedestrian traffic.

According to one embodiment of the third aspect, the floor unit is configured such that the depressible upper surface preferably deflects between 1 mm and 20 mm, more preferably between 2 mm and 10 mm and optimally between 4 mm and 7 mm under the influence of human footfall. A floor unit may preferably be configured such that the depressible upper surface deflects up to 100 mm under the influence of vehicular traffic.

According to one embodiment of the third aspect, the depressible upper surface comprises a flexible membrane or sheet which may, for example, be formed of rubber, preferably recycled rubber or recycled rubber car tyres. Alternatively, the depressible upper surface may comprise a platform which is configured to be depressed in a downward direction under the influence of traffic and then to return to the starting position as the traffic forces are removed.

It is important for embodiments of the third aspect of the present invention to be designed so as to minimise the possibility of that the floor unit poses a hazard, e.g. a trip hazard, to traffic passing over the unit. In this respect, in the case where the depressible upper surface comprises a flexible membrane or sheet, it is preferable that at least the edges of the flexible membrane which confront—i.e. run perpendicular to—the expected flow of traffic, are fixed to the floor unit so that those edges of the depressible upper surface do not stand proud of the surrounding floor, or are substantially flush with the surrounding floor.

In the case where the depressible upper surface comprises a platform, the starting position of the platform is such that the depressible upper surface is preferably substantially flush with the surrounding upper floor surface.

According to a preferred embodiment of the third aspect, the upper surface of the floor unit comprises at least one illumination device. Preferably, a portion of the electricity generated by the electricity generator of the floor unit in use is used to power the illumination device. According to one particular embodiment, 5% of the energy generated by each downward deflection of the depressible upper surface of the floor unit is used to illuminate the illumination device(s) of the floor unit, whilst the remainder is output for storage or for powering applications such as low energy lighting and signage.

According to a fourth aspect of the present invention, there is provided a method of installing a floor unit of the third aspect.

A motion convertor according to embodiments of the present invention effectively acts as a clutch, facilitating engagement and disengagement of the engagement elements with the rotatable disk. As a downward force is applied to cause the linear displacement of the engagement element(s) in a first direction towards the rotatable disk, contact between the engagement element(s) and the rotatable disk is maintained by the progressive cooperation of engagement element(s) with the rotatable disk. As the downward forces are removed, causing the linear displacement of the engagement element(s) in a direction opposition to the first direction, contact between the engagement element(s) and the rotatable disk is broken, thereby allowing the disk to spin unhindered by the engagement element(s).

It will be appreciated that cooperation of the engagement element(s) with the rotatable disk causes the engagement element(s) to move from a start position towards an end position, typically about rotation of a shaft. Preferably, the engagement element(s) comprises a biasing means which serves to bias the engagement element(s) towards the start position so that when the downward forces are removed, the engagement element(s) disengage from the rotatable disk and return to the start position. The engagement element may advantageously be weighted such that the engagement element is biased under the influence of gravity to return to the starting position. Alternatively or additionally, magnetic biasing means are provided which serve to bias the engagement element(s) towards the start position under the influence of magnetic forces. For example, the engagement element may be provided with a magnet arranged so as to experience magnetic forces of attraction with another magnet, or with magnetic material, which serves to pull the engagement element towards the start position. This arrangement is particularly advantageous since the strength of the magnetic force (e.g. magnetic attraction) will diminish as the engagement element progresses further from the start position. Thus, when the engagement element has progressed to the end of a stroke and is at or near the end position, e.g. following delivery of an impulse force to the rotatable disk, the magnetic forces of attraction which serve to return the engagement element towards the start position will be weak (or zero). As such, the engagement element will initially experience relatively gentle return forces, primarily under the influence of gravity, until the magnet is sufficiently close to the start position that the strength of the magnetic forces of attraction have greater effect. The complimentary use of gravitational and magnetic forces in this way minimizes the occurrence of drag forces (i.e. due to contact between the engagement element and the rotatable disk) which would occur if the engagement element were to experience strong return forces at the end of the stroke and which would detrimentally slow the rotation of the disk.

Features of one aspects discussed above may be applied to any of the other aspects. Embodiments of the present invention will now be described, by way of example, to the accompanying drawings in which.

Figure 1B:
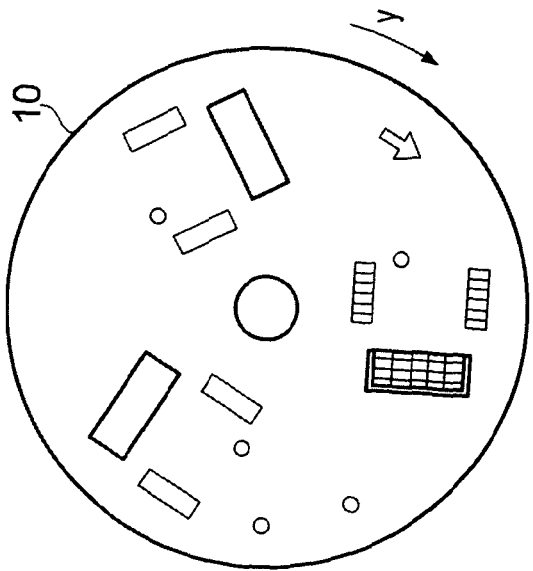
FIG. 1 shows a motion convertor according to a first embodiment of the present invention.
Figure 1B:
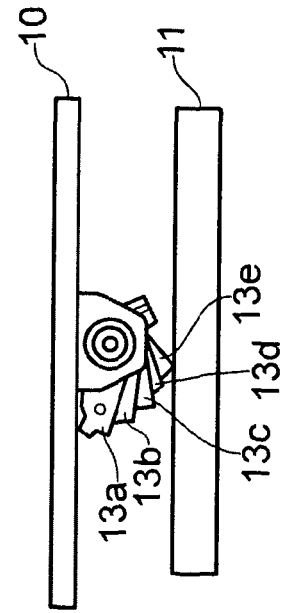

FIG. 1 shows a motion convertor according to an embodiment of the present invention comprising a "pusher" carriage 10 and a rotatable disk 11. The pusher carriage 10 comprises three, linearly-displaceable, engagement elements 12*a*, 12*b* and 12*c*, each engagement element comprising a plurality of engagement teeth 13*a*, 13*b*, 13*c*, 13*d* and 13*e* which are disposed for rotation between a start position, shown in FIG. 1A, and an end position, shown in FIG. 1B, about a shaft 14 of the engagement element.

Upon a force being applied on the upper surface of the plate 10, the force having a component in a downward direction X, the plate 10, and thus the linearly-displaceable engagement element(s), is caused to descend. The teeth 13 of each engagement element are disposed such that the downward descent of the pusher carriage 10 causes each successive tooth to make contact with the disk as the engagement element rotates about the shaft 14 disposed substantially perpendicular to direction X, whereupon the vertical force is transmitted to the disk and translated to horizontal spin.

Figure 1A:
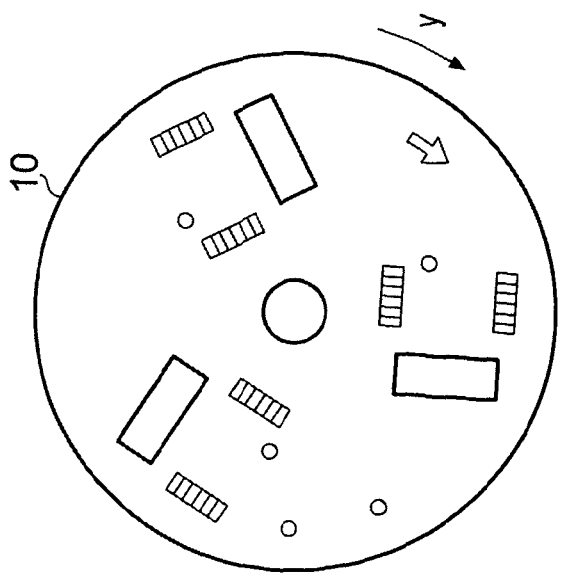
Figure 1A:
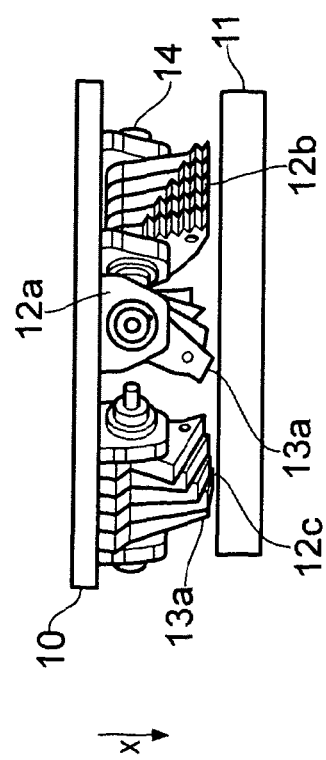

Specifically according to the embodiment shown in FIG. 1 and with particular reference to FIG. 1A, which shows the starting position of the three engagement elements, tooth 13*a* of each of the engagement elements 12*a*, 12*b* and 12*c* is the first tooth to be in contact with the rotatable disk. According to the present embodiment, each tooth cooperates with an indentation (not shown) provided in the rotatable plate 11. The downward vertical force acting on the tooth 13*a* is trans-mitted into the disk, causing the tooth to turn about the shaft 14, and thereby further causing the disk to spin in a direction Y. The progressive linear motion of the plate 10 thus causes the teeth to successively cooperate with indentations provided in the rotatable place until the engagement element has been moved to an end position, as shown in FIG. 1B. Moreover, according to the illustrated embodiment, the speed of spin is accelerated, given a steady series of vertical forces, by each tooth being successively closer to the centre of the rotating disc 11.

Figure 2:
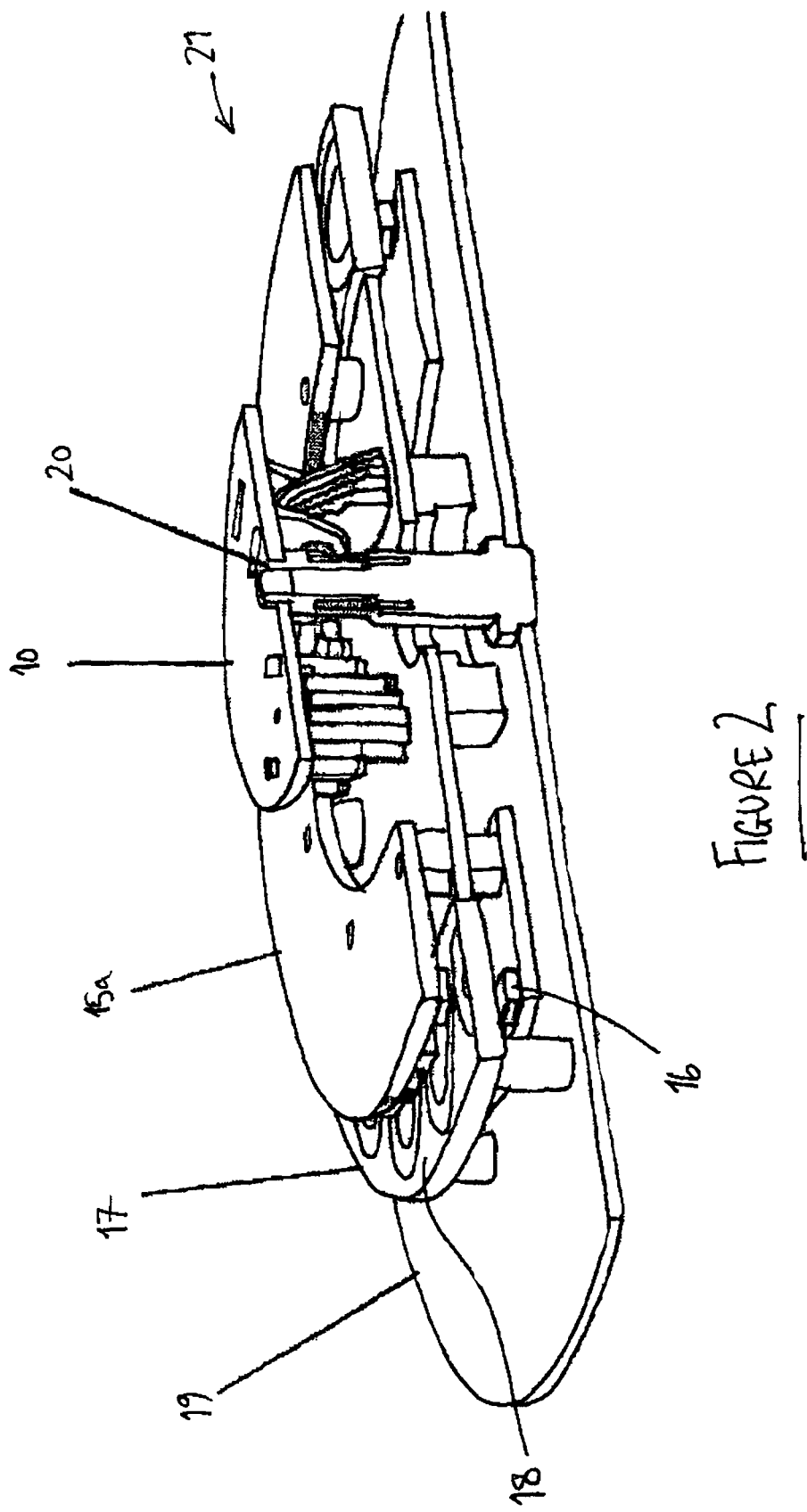
FIG. 2 shows a kinetic energy harvester according to an embodiment of the present invention.

FIG. 2 shows an assembly 21 for harvesting kinetic energy comprising the motion convertor of FIG. 1 and an electric generator comprising a twin rotor having a pair of planar rotors 15*a* and 15*b*, each planar rotor having a plurality of magnets 16 secured near the outer perimeter thereof, and a stator 17 comprising a plurality of coils 18. The pusher plate 10 is operable to move linearly on a vertical axis by virtue of a longitudinal "collar" 20. The illustrated assembly is mounted on a base 19.

In use, the pusher carriage 10 experiences a downward force from the floor surface above as a result of traffic passing over the floor surface. The force exerted depresses the pusher carriage 10 and the engagement elements, each substantially identical and comprising in this illustration separate teeth, which engage with the rotatable disk. In this way, downward linear force is translated into rotational spin of the rotor. The generator in this illustration employs an air gap style axial flux alternator using copper coils 18 in which electro motive force is induced by the passage of the flux from the interlocking magnetic fields from an alternating polarity, circular array of permanent magnets.

FIG. 3 shows a pusher carriage assembly 110 having a three engagement elements 112*a*, 112*b* and 112, c. The pusher carriage assembly 110 forms part of a motion convertor according to a second embodiment of the present invention. Each of the engagement elements comprises a curved engagement edge 114.

Figure 3A:
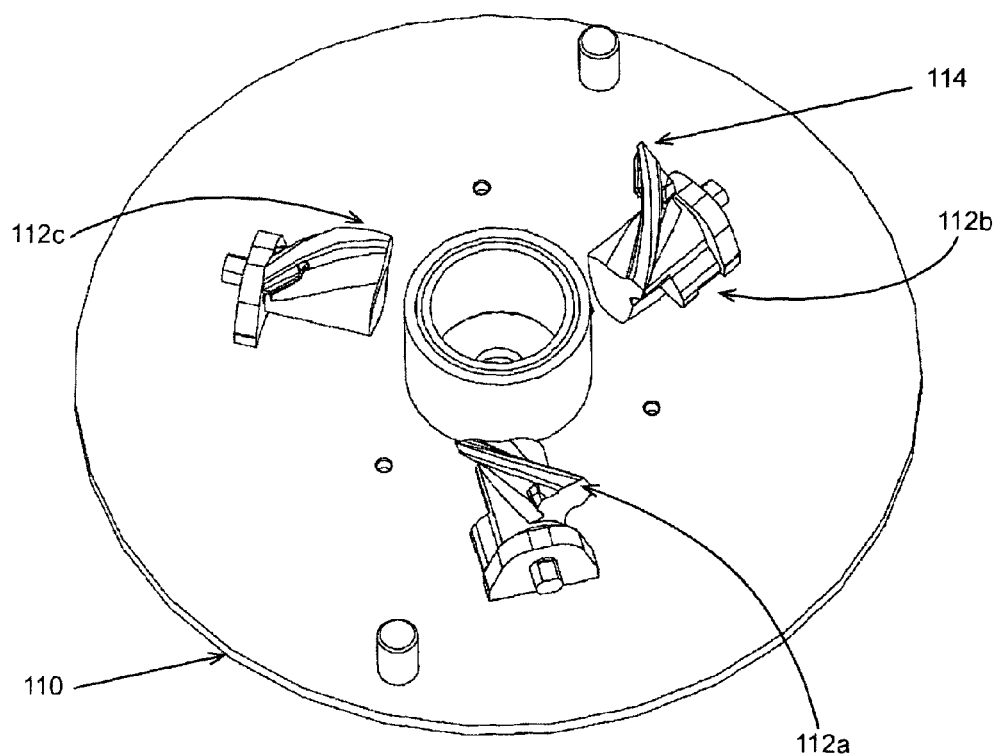
FIG. 3 shows a pusher carriage assembly having hree engagement elements and forming part of a motion convertor according to a second embodiment of the present invention.
Figure 3B:
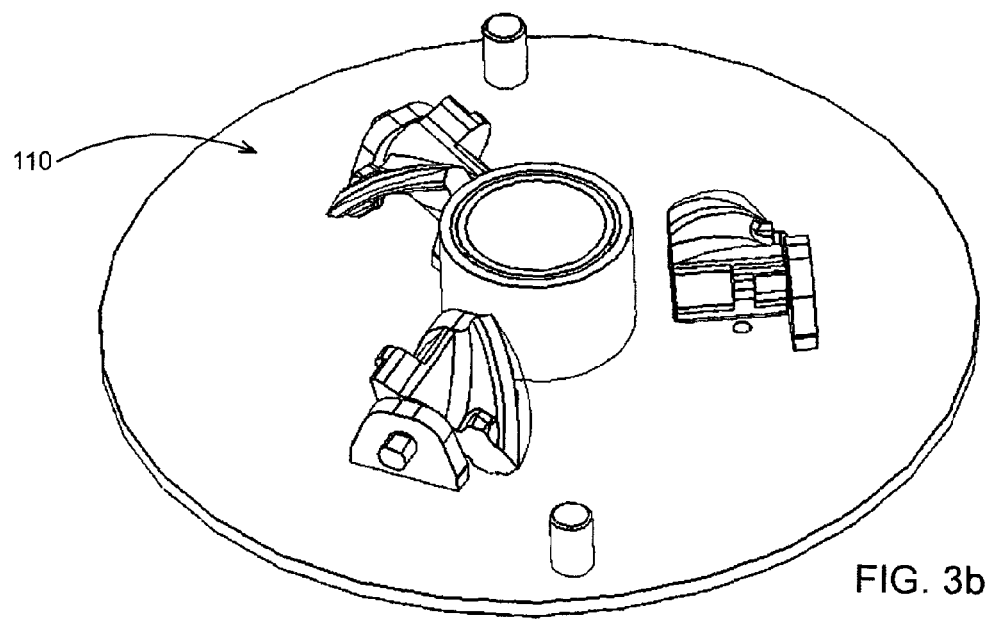

FIG. 3*a* shows the pusher carriage assembly 110 in the start position, with each hard curved engagement element 112*a*, 112*b* and 112*c* initially arranged ready to be depressed. As the curved edge of the engagement element progressively engages with a rotatable disk (shown in FIG. 4), the downward force resolves over the course of a depression so that a proportion of the force is translated into a steady push of the wheel. According to the illustrated embodiment, the pusher/disk inertial mass, along with generator pairing, is advantageously tailored to the expected forces (e.g. vehicle/pedestrian) which will be of a predictable duration and scale (e.g. vehicle/pedestrian). Once an impulse force is delivered, the engagement elements will have progressed to the end position shown in FIG. 3*b* and a very high proportion of the energy will be conserved in the rotational spin motion due to the simple construction of the assembly which utilizes very few moving parts. Once the impulse is removed, the engagement elements disconnect from the rotatable disk and in so doing the pusher carriage assembly can be considered to act as a clutch allowing the disk to spin free of the engagement elements. The carriage starts to return to its rest position as gravity pulls each of the engagement elements downwardly, towards the start position, until the engagement elements are brought into range of magnetic forces of attraction between magnets (not shown) provided on the engagement elements and the elements are thus returned to their start positions ready to receive the next impulse.

Figure 4:
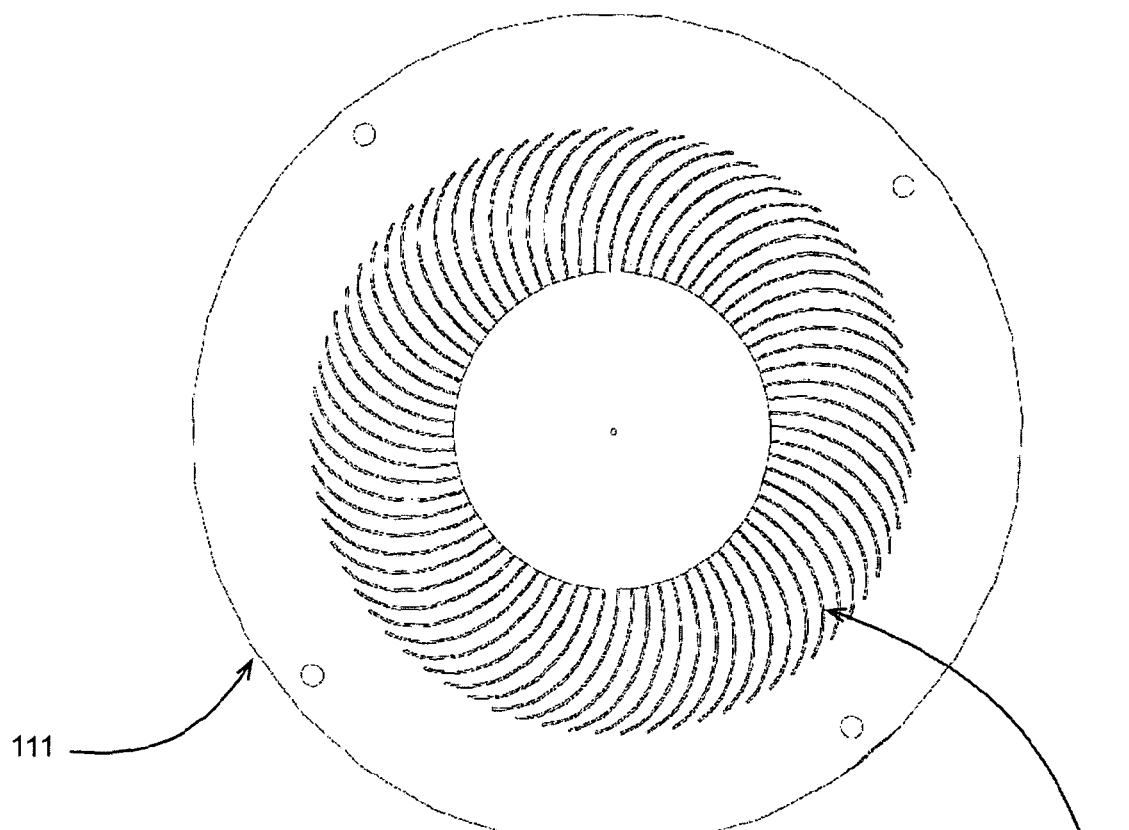
FIG. 4 shows a rotatable disk for use in conjunction with the pusher carriage assembly shown in FIG. 3.

FIG. 4 shows a rotatable disk 111 for use in conjunction with the pusher plate configuration shown in FIG. 3. The rotatable disk 111 comprises a plurality of radial-extending grooves 115. According to this embodiment, the radially-extending grooves are shaped so as to cooperate with the curved edge of the engagement elements 112 shown in FIG. 3 as they experience a progressive linear displacement towards the rotatable disk 111. The precise shape of the curve may be optimised having regard for the nature of the impulse forces expected.

Figure 5:
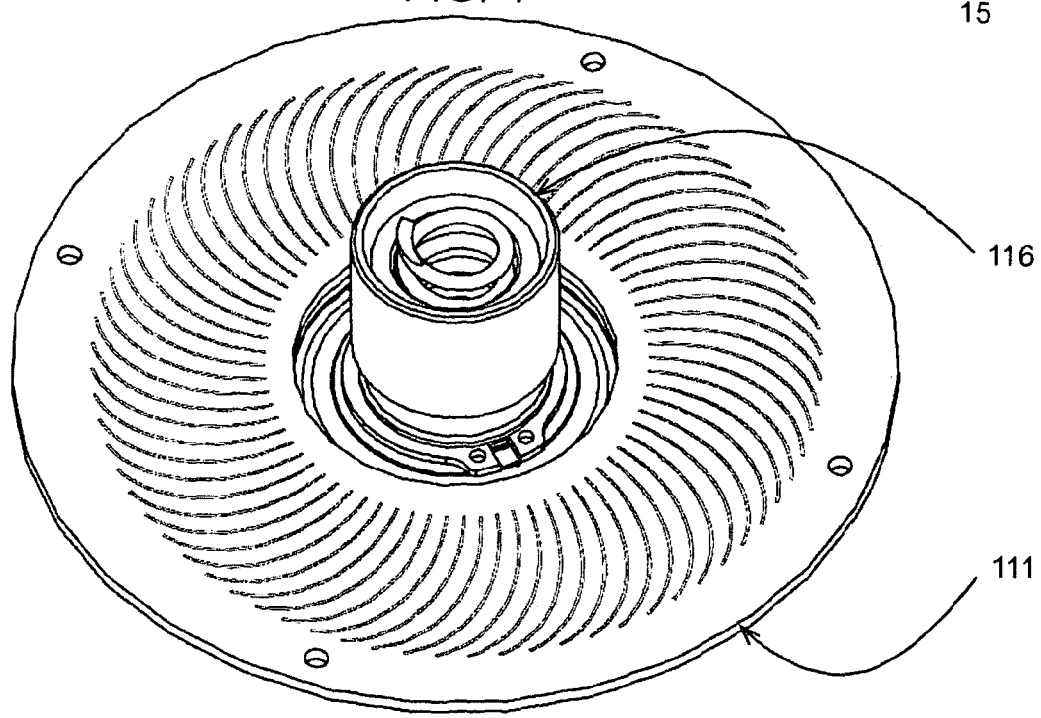
FIG. 5 shows a further rotatable disk for use in conjunction with the pusher carriage assembly shown in FIG. 3.

FIG. 5 shows a further rotatable disk for use in conjunction with the pusher plate configuration shown in FIG. 3 having a rolling-element bearing 116 at the centre of the disk to facilitate cooperation between the rotatable plate 111 and an axial shaft.

Figure 6:
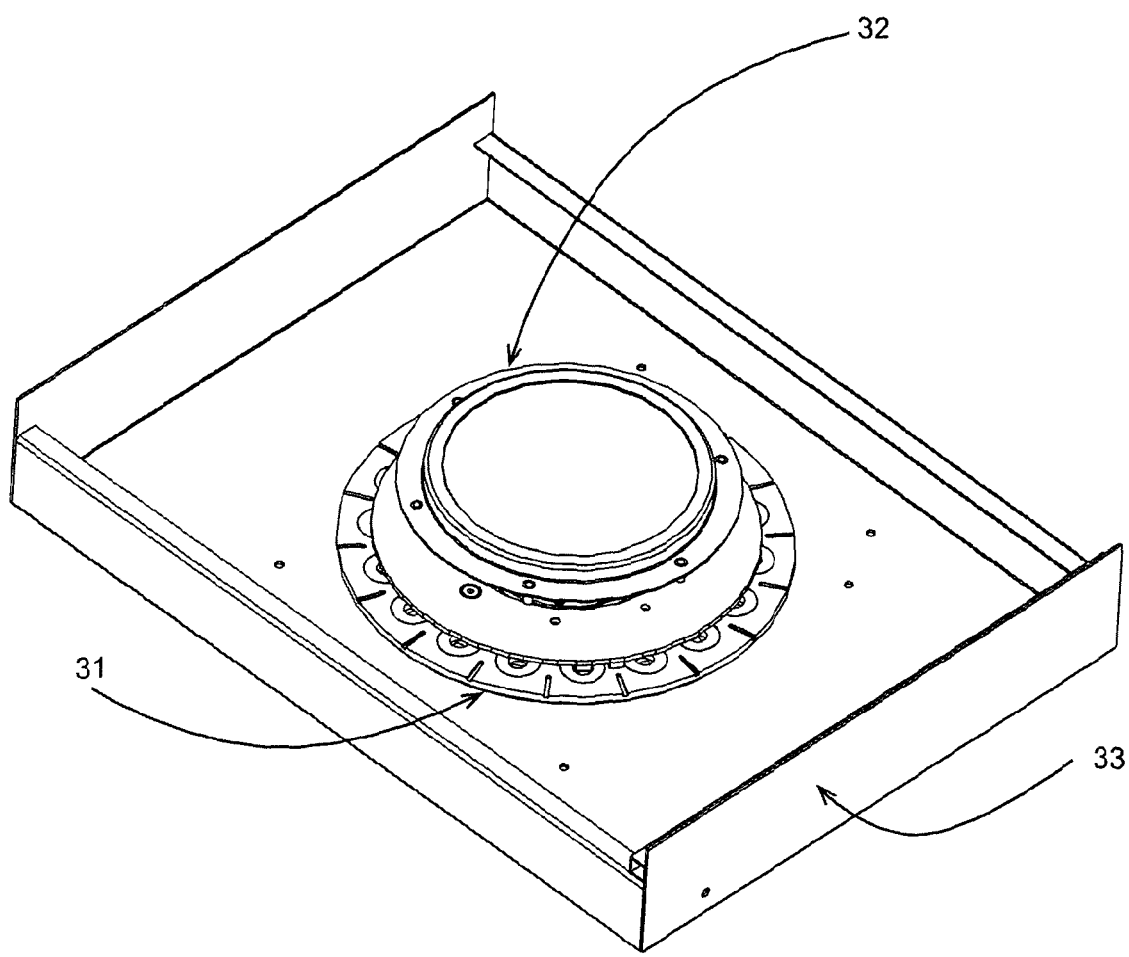
FIG. 6 shows the internal configuration of a floor unit embodying the present invention.

FIG. 6 shows the internal configuration of a floor unit 30 embodying the present invention comprising an assembly 31 for harvesting kinetic energy according to an embodiment of the second aspect of the present invention. The unit is also provided with an illumination means 32 which will be powered using a portion of the electricity generated by the assembly 31.

Thus, according to the embodiment shown in FIG. 6, the motion convertor mechanism is fixed within a box 33 which is shaped and sized according to the shape and size of the intended adjacent floor units. For example, the box 33 may be the same size as a normal paving slab.

Figure 7:
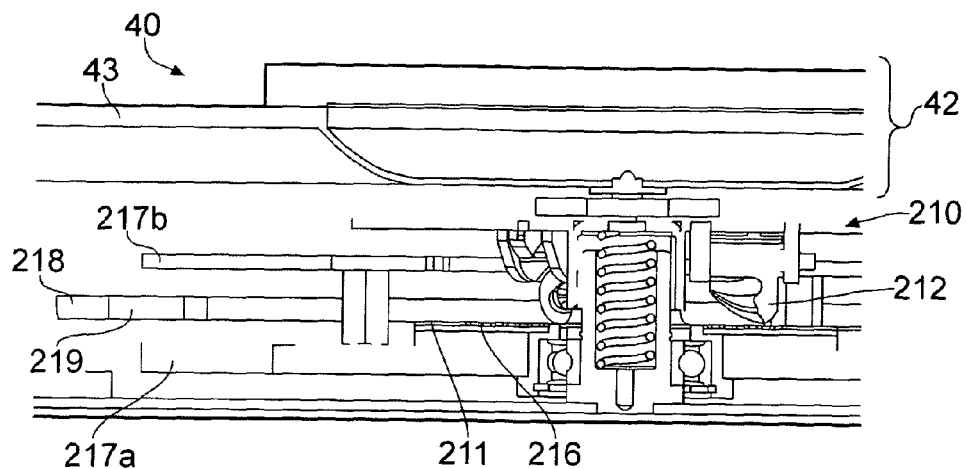
FIG. 7 shows a detailed cross-sectional view through a floor unit embodying the present invention.

FIG. 7 shows a detailed cross-sectional view through a floor unit 40 embodying the present invention, the floor unit comprising a flexible top sheet 43 having an illumination device 42 inset thereto. A motion convertor is provided comprising a pusher plate 210 having engagement elements 212 which cooperate with radially—extending grooves 215 provided on the rotatable disk 211 in use. The rotatable disk 211 is arranged to rotate concurrently with a planar rotor 217a. A second planar rotor 217b is provided to form a twin rotor arrangement wherein the rotors 217a and 217b rotate either side of a stator 218 having a plurality of axial coils 219. Each of the rotors 217a and 217b are provided with a plurality of magnets (not shown). The coils 219 are connected for output to a load as required.

In use, the top sheet typically flexes between 2-10 mm for human footfall and more for vehicle operation, each time force is applied. The top sheet acts as a beam that is simply supported at each end. In use, the flexible top sheet does not bend beyond its elastic limit and returns to its original position.

Figure 8:
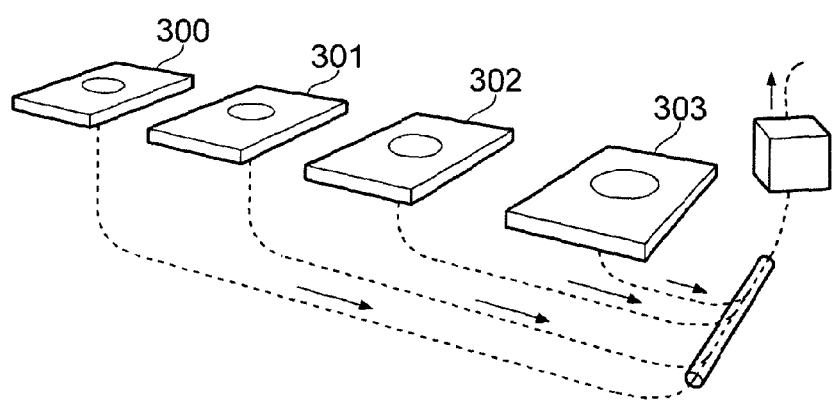
FIG. 8 shows a plurality of floor units embodying the present invention.

FIG. 8 shows an arrangement of four floor units 300, 301, 302 and 303 embodying the present invention, the floor units being connected in parallel to provide electricity generated thereby to a control box 304. The control box, comprising a battery, may be wired for supplying power to a system as required.

The invention claimed is:

1. A motion convertor for converting kinetic energy from the movement of traffic into rotational energy for operating a rotor of an electricity generator, the motion convertor comprising at least one engagement element and a disk rotatable about a substantially vertical axis, the engagement element being vertically linearly-displaceable relative to the rotatable disk, wherein the engagement element is rotatably mounted such that progressive substantially vertical displacement in a direction towards the rotatable disk causes engagement of the engagement element with the rotatable disk and rotation of the engagement element, thereby causing the rotatable disk to rotate.

2. A motion convertor as claimed in claim 1, wherein the engagement element comprises a plurality of teeth, the teeth being arranged such that progressive linear motion of the engagement element in a direction towards the rotatable plate causes the teeth to successively cooperate with the rotatable disk.

3. A motion convertor as claimed in claim 2, wherein the rotatable disc is provided with a plurality of indentations in the surface thereof which are arranged such that progressive linear motion of the engagement element causes each of the plurality of teeth to successively cooperate with one of the indentations.

4. A motion convertor as claimed in claim 1, wherein the engagement element comprises a curved engagement edge, the curved engagement edge being shaped such that progressive linear motion of the engagement element towards the rotatable disk causes progressive engagement of the curved engagement edge with the rotatable disk.

5. A motion convertor as claimed in claim 4, wherein the rotatable disc is provided with a plurality of radially-extending grooves which are shaped such that progressive linear motion of the engagement element causes progressive engagement of the curved engagement edge with one of the radially-extending grooves.

6. A motion convertor as claimed in claim 1, wherein engagement of the engagement element with the rotatable disk causes said engagement element to move from a start position towards an end position, and wherein the engagement element comprises a biasing means which serves to bias the engagement element towards said start position.

7. A motion convertor as claimed in claim 6, wherein the engagement element is weighted so as to form the biasing means, and/or wherein the biasing means comprises a magnet.

8. A motion convertor as claimed in claim 1, further comprising a linearly-displaceable plate, wherein the engagement element(s) are provided on the underside of the plate such that linear displacement of the plate in a direction towards the rotatable disk causes a corresponding linear displacement of the engagement element(s).

9. A motion convertor as claimed in claim 1, wherein the rotatable disk is arranged to spin by means of a rolling-element bearing at the centre of the rotatable disk.

10. A motion convertor as claimed in claim 1, wherein the rotatable disk is arranged to spin by means of a point bearing provided at the centre of the rotatable disk.

11. An apparatus for harvesting kinetic energy comprising a motion converter as claimed in claim 1, wherein rotation of the rotatable disk operates the rotor of the electricity generator.

12. An apparatus for harvesting kinetic energy as claimed in claim 11, wherein the electricity generator comprises an axial flux generator.

13. An apparatus for harvesting kinetic energy as claimed in claim 11, wherein the generator comprises a radial flux generator.

14. A floor unit comprising an apparatus for harvesting kinetic energy, the floor unit comprising:
   a motion convertor for converting kinetic energy from the movement of traffic into rotational energy for operating a rotor of an electricity generator, the motion convertor comprising at least one engagement element and a disk rotatable about a substantially vertical axis, the engagement element being vertically linearly-displaceable relative to the rotatable disk, wherein the engagement element is rotatably mounted such that progressive substantially vertical displacement in a direction towards the rotatable disk causes engagement of the engagement element with the rotatable disk and rotation of the engagement element, thereby causing the rotatable disk to rotate;

the electricity generator including the rotor which is rotatable by the rotatable disk of the motion convertor; and a depressible upper surface, wherein depression of the depressible upper surface causes linear displacement of the engagement element of the motion convertor in a direction towards the rotatable disk of the motion convertor.

15. A floor unit as claimed in claim 14, wherein the depressible upper surface comprises a flexible membrane.

16. A floor unit as claimed in claim 15, wherein the flexible membrane is formed of recycled rubber car tyres.

17. A floor unit as claimed in claim 14, wherein the depressible upper surface comprises a platform which is linearly depressible in a downward direction.

18. A floor unit as claimed in claim 14, wherein the upper surface of the floor unit comprises at least one illumination device.

19. A floor unit as claimed in claim 18, wherein a portion of the electricity generated by the electricity generator of the floor unit in use serves to power the illumination device.

* * * * *